May 22, 1928.
C. G. MUNTERS
1,670,632
REFRIGERATOR
Filed Nov. 27, 1926
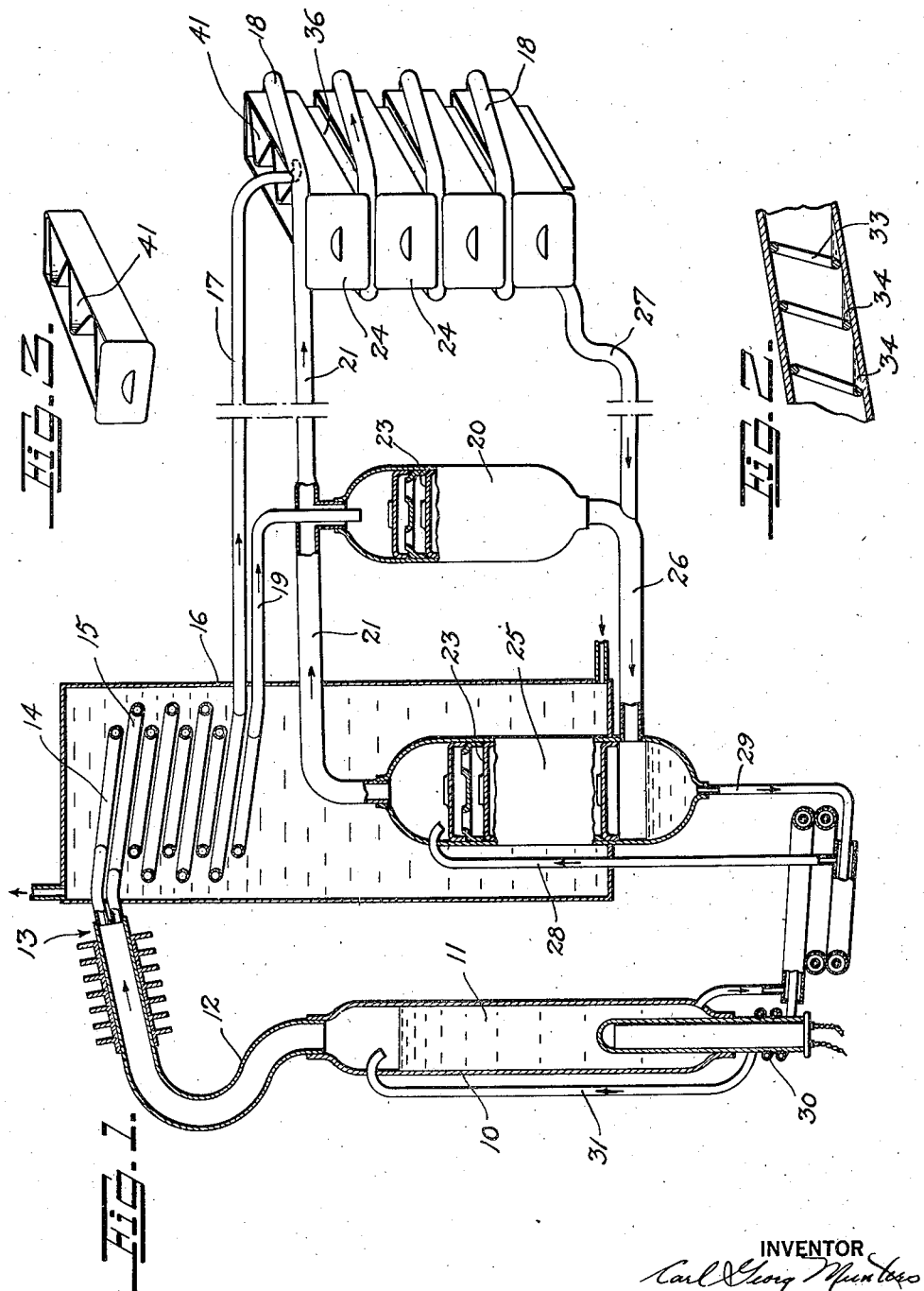

Patented May 22, 1928.

1,670,632

UNITED STATES PATENT OFFICE.

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE.

REFRIGERATOR.

Application filed November 27, 1926, Serial No. 151,080, and in Sweden January 9, 1926.

This invention relates to refrigeration and, in one phase, to refrigerating apparatus wherein a plurality of evaporators are connected to a single source of refrigerant supply. In one phase, the invention relates specifically to refrigerating apparatus of the absorption type.

The invention will be apparent from the accompanying drawing showing one embodiment of my invention. In the drawing: Fig 1 shows a refrigerating system embodying the invention; Fig. 2 shows a detail of a portion of Fig. 1; and Fig. 3 shows an ice mold for use in the system of Fig. 1.

In the drawing, 10 designates a generator which may be heated in any desired manner, and which contains a solution of cooling agent in absorption liquid. As one example, ammonia is designated as the cooling agent and water as the absorption liquid. Vapor is produced in generator 10 and flows into conduit 12. The vapor is separated into a plurality of streams at 13 and enters a plurality of condensers 14, 15. The condensers are cooled in any desired manner as by cooling water in tank 16.

Condenser 15 is connected by means of conduit 17 with an evaporator 18. Condenser 14 is connected with an evaporator 20 by means of a conduit 19. There is a separate condenser for each of the plurality of evaporators. The separation of the ammonia into several streams is effected before the ammonia enters the evaporator thus ensuring a proper separation. The separation of liquid into several streams cannot be as effective as separation of gas particularly in case of slow fluid velocity.

Hydrogen gas (as a suitable auxiliary gas to cooperate with ammonia) is supplied to evaporators 18 and 20 through conduit 21. In the evaporators the ammonia diffuses into the hydrogen and refrigeration is produced. Evaporator 20 contains a series of trays 23 for obtaining a large surface of liquid for gas contact. Evaporator 18 consists of a continuous coil which is wound around so as to permit the insertion of ice molds 24 between portions thereof. The coil is made of convolutions so arranged that there is a continuous flow for gas and liquid downwardly therethrough.

In each of the evaporators there is formed a mixture of hydrogen and ammonia which passes to the lower part of absorber 25 through conduits 26 and 27. In the absorber 25 the ammonia is absorbed and hydrogen liberated, the hydrogen passing back through conduit 21 to again mix with ammonia. Weak liquid passes from the lower part of the generator through conduit 28 and into the upper part of the absorber. Strong absorption liquid passes through conduit 29 and through auxiliary generator 30 and thence through conduit 31 into the upper part of the generator. Conduits 28 and 29 are arranged in heat exchange relation to transfer heat from the liquid in conduit 28 to the liquid in conduit 29. Auxiliary generator 30 lifts the liquid in the absorber to the higher level in the generator. The absorber is also supplied with a series of trays 23 to provide a large surface of gas and liquid contact. The circulation through the evaporators and absorber takes place due to differences in gravity within the vertically extending conduits and paths of the system.

The evaporator 18 is preferably equipped with a spiral wire 33 which causes formation of a series of pools 34. This aids the evaporation. Where portions of the coil are substantially horizontal and portions of considerable slope, this wire should be placed in the sloping portions. The evaporator may be made of a pipe continuously sloping so that the wire may be used throughout its length.

Ice molds 24 are supported upon angle irons 36 which are welded to the loops of the coil.

Fig. 3 shows an ice mold adapted to be inserted between the convolutions of evaporator coil 18. The ice mold is formed with an inner corrugated member 41 which is adapted to form ice pieces of triangular cross section. Member 41 is made of a single strip of metal and permits removal of the ice pieces without running water over the ice mold. A simple twist of member 41 serves to unloosen the ice pieces.

The ability of ammonia to diffuse into hydrogen increases with increase of temperature of the hydrogen. In other words, at a high temperature, hydrogen gas has a greater capacity for absorbing gaseous ammonia. Due to this relation, a unique automatic balance is obtained in respective evaporative effects of the above described apparatus. Assume that little or no heat is being taken up in evaporator 18. The temperature reduces to a point where very little diffusion takes place. This evaporator then automatically puts itself out of function or materially decreases its activity due to the internal characteristics of the fluids of the system. Likewise evaporator 20 ceases to function or decreases its activity when it becomes very cold due to the inability of ammonia to diffuse into hydrogen at low temperatures. While either evaporator is temporarily ineffective the other evaporator may be in full operative condition. Thus, due to the pressure equalizing medium a complete automatic balance is obtained and together with the separation of the refrigerants prior to entry into the condensers, a complete system of high efficiency is obtained for use where independent refrigerative effects are desired.

While I have illustrated my invention in connection with the type of apparatus shown in Patent No. 1,609,334 granted December 7, 1926, to Baltzar Carl von Platen and myself jointly, to which patent further reference may be had as to phases of the specific type of apparatus illustrated, it will readily be understood that other structures may be used for carrying out the invention.

Having thus described my invention, what I claim is:

1. Refrigerating apparatus comprising, in combination, a generator, a conduit for conducting vapor from said generator, a plurality of condensers, each connected to said conduit and a plurality of evaporators connected to the condensers.

2. Refrigerating apparatus comprising a plurality of evaporators, a plurality of condensers, one for each evaporator, and a generator arranged to supply vapor to said condensers in parallel.

3. Refrigerating apparatus comprising a generator, an absorber, a plurality of condensers, a plurality of evaporators and connections for circulating a cooling agent through the absorber and generator and in parallel through the condensers and evaporators, for circulating an auxiliary agent through the absorber and in parallel through the evaporators and for circulating absorption liquid through the generator and absorber.

4. Refrigerating apparatus comprising a plurality of evaporators, a plurality of condensers each independently connected to a separate evaporator in open unobstructed communication to permit the same pressure to exist in the respective condensers and evaporators, a single generator arranged to supply vapor of a cooling agent to the plurality of condensers and means to convey cooling agent from the evaporator to the generator, the apparatus comprising an auxiliary agent for permitting the said same pressure to exist.

5. Refrigerating apparatus comprising a plurality of evaporators, a plurality of condensers each independently connected to a separate evaporator in open unobstructed communication to permit the same pressure to exist in the respective condensers and evaporators, a single generator containing a cooling agent dissolved in an absorption liquid, means to conduct vapor from said generator to said plurality of condensers, an absorber, means to circulate absorption liquid between the generator and absorber and means to circulate an auxiliary gas between the absorber and evaporators.

6. Refrigerating apparatus comprising a plurality of evaporators, a plurality of condensers each independently connected to a separate evaporator in open unobstructed communication to permit the same pressure to exist in the respective condensers and evaporators, said condensers being situated above the respective evaporators to which they are connected, a single generator situated below said condensers and arranged to supply vapor of a cooling agent to the plurality of condensers and circulation means to convey cooling agent from the evaporator to the generator, said circulation means operating to transport an auxiliary agent contained in the apparatus for permitting the said same pressure to exist.

7. That improvement in the art of refrigeration by the aid of a system including a generator, condensing means, an absorber and a plurality of evaporators which consists in diffusing a cooling agent into an auxiliary agent in each of the evaporators such that the rate of diffusion bears a relation to the temperature of the auxiliary agent.

8. That improvement in the art of refrigeration by the aid of a system including a generator, condensing means, an absorber and a plurality of evaporators which consists in introducing liquid cooling agent into each of the evaporators and circulating a gaseous auxiliary agent though each of the evaporators and through the absorber.

9. That improvement in the art of refrigeration by the aid of a system including a generator, condensing means, an absorber and a plurality of evaporators which consists in diffusing ammonia into hydrogen in each of the evaporators.

10. That improvement in the art of refrigeration by the aid of a system including a generator, a plurality of condensers, a plurality of evaporators and an absorber which consists in conducting vaporous cooling agent from the generator, in parallel to the condensers, conducting liquid cooling agent from individual condensers to individual evaporators, circulating absorption liquid between the generator and the absorber and circulating an auxiliary agent through each of the evaporators and through the absorber, the auxiliary agent being of such nature that as its temperature is increased less cooling agent is capable of diffusing into a unit by weight thereof.

In testimony whereof I have affixed my signature.

CARL GEORG MUNTERS.